United States Patent Office 2,715,430
Patented Aug. 16, 1955

2,715,430

APPARATUS FOR CONTROLLING PRESSURE IN PNEUMATIC TIRES

Myrl A. Lindeman, Drexel Hill, Pa., assignor to Sun Oil Company, Philadelphia, Pa., a corporation of New Jersey Application August 2, 1952, Serial No. 302,443

1 Claim. (Cl. 152—416)

This invention relates to apparatus for controlling pressure in pneumatic tires and has particular reference to the maintenance of equal pressures in a plurality of pneumatic tires at a predetermined value.

In the application of Johnson and Mayes, Serial No. 776,250, filed September 26, 1947, now Patent No. 2,647,323, there is described an elevation meter of a type involving a pendulum associated with apparatus for control of the pendulum and translation of various quantities involved into terms of change of elevation. The apparatus there described is capable of giving elevation measurements to a high degree of precision despite the fact that the pendulum is mounted on a trailer towed behind a car or truck over poor roads or rough terrain. As will be evident from the disclosure of said apparatus, its proper operation depends upon two factors related to the pendulum-carrying trailer: first, the maintenance of a constant inclination of the trailer with respect to the roadway on which motion is taking place and in the direction of motion, and secondly, an accurate measurement of distance along the roadway through measurement of rotation of one of the trailer wheels. To conform with the first requirement, the trailer is desirably provided with three wheels, of which two serve to determine the angular inclination of the trailer body with respect to the roadway in the direction of movement, the third wheel being essentially solely for support against rocking movements transverse to the direction of movement. The two primary wheels are mounted without spring support to the trailer body, and are provided with pneumatic tires. It will be evident that, accordingly, the angle of inclinaiton of the trailer in the direction of movement with respect to the roadway may be maintained constant only if the tires of the main wheels are inflated constantly to the same pressure so that, on the average, they will have constantly related diameters. It may be here remarked that, as will be evident from said application, measurements are made in a statistical fashion so that momentary changes of diameter due to the striking of rocks or the like in the roadway will be, on the average, balanced out so as not to affect the ultimate measurements to a detrimental degree.

The second requirement is that the particular wheel which serves to give rise to measurements of distances traversed along the roadway should have a constant diameter (on the average) so that its rotations will give an accurate measurement of the traversed distance.

It is the object of the present invention to provide apparatus for maintaining constant at a predetermined value the pressures in the main tires of the trailer referred to. In accordance with the invention, precise pressure control is secured within 0.1 pound per square inch. Maintenance of constant pressure to this degree insures that, on the average, the diameters of the tires will not change sufficiently to affect the ultimate elevation measurements to a detrimental extent.

Further objects of the invention relate to provisions for maintaining constant pressures to the desired degree of accuracy despite conditions arising, for example, due to impacts applied to the tires by roughness of the terrain traversed.

The attainment of the foregoing objects will become apparent from the following description read in conjunction with the acompanying drawings, in which.

Figure 1:
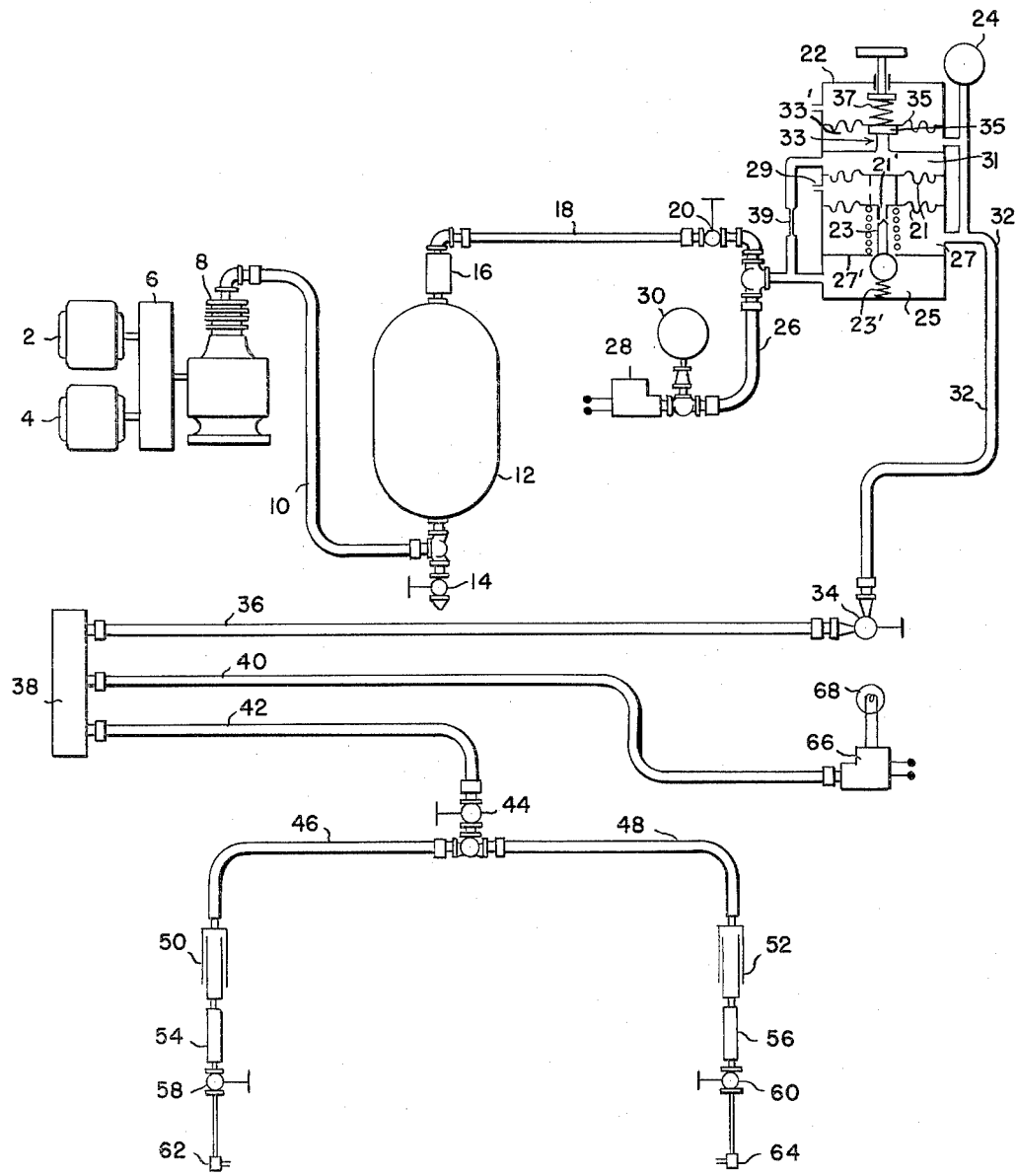
Figure 1 is a diagram showing the pressure control system.

Referring first to Figure 1, there are illustrated therein motors 2 and 4 of low voltage type, to be driven from the usual low voltage supply of the truck or car which draws the trailer, these motors driving through a gear box 6 a small compressor 8 which supplies air through connection 10 to a supply tank 12. This supply tank is provided with a blowdown valve 14 for removal of accumulated moisture at intervals, and from it air is delivered through an air filter 16 and line 18 to a shut-off valve 20 from which air is delivered to the supply chamber 25 of a regulator of conventional type which is diagrammed at 22 and more fully described in Patents No. 2,501,957 and No. 2,359,-236. This regulator and its operation need not be described in detail, but it will suffice to point out that it is provided with a double diaphragm 21 arranged between output chamber 27 and a second chamber 31 which is connected to the supply chamber 25 through a flow restriction 39. The space between the diaphragm elements 21 is vented to the atmosphere at 29. A valve 23 is pressed upwardly by a light spring 23'. When the double diaphragm moves downwardly, the lower diaphragm 21 engages the upper end of the valve 23 which serves to close off the passage 21' through the lower diaphragm 21 which normally provides communication between the chamber 27 and the vent 29. Further downward movement of the double diaphragm moves the valve 23 downwardly and serves to open a passage through a baffle 27' between the chambers 25 and 27 which is normally sealed by the enlarged lower portion of the valve 23. From the foregoing it will be evident that downward motion of the double diaphragm 21 serves to close off communication between the chamber 27 and the vent 29 and to open communication between the chamber 27 and the chamber 25. Upward motion of the double diaphragm serves to close off communication between the chamber 27 and the chamber 25 and to open communication between the chamber 27 and the vent 29.

In order to secure high accuracy of control there is provided a pilot arrangement including a nozzle 33 providing communication between chamber 33' and chamber 31 and arranged to be controlled by a diaphragm 35 and a valve member 35' affixed thereto which is urged downwardly to an adjustable degree by a manually controllable spring 37, the space beneath the diaphragm 35 being in communication with the chamber 27. The pressure in chamber 31 acting to depress the double diaphragm is determined at any time by the relative values of the resistance to the flow of air through the fixed flow restriction 39 and the variable flow restriction provided by the valve member 35' and the nozzle 33. The delivery connection from the regulator is indicated at 32 and communicates with an air gauge 24 for visual indication of the regulated pressure.

A connection 26 from the valve 20 extends to a pressure switch 28 which controls the operation of motors 2 and 4 to maintain a desired pressure in the supply tank 12, this pressure being substantially in excess of that which is delivered from the regulator. A gauge 30 is provided to indicate the supply tank pressure. The pressure in the supply tank is not subject to close regulation but rather varies between limits which are reasonably spaced to insure that the motors 2 and 4 operate only at suitably spaced intervals. For example, these motors may operate the compressor only about one-fifth of the time.

The delivery connection 32 supplies air through a valve 34 and connection 36 to a surge tank 38. The valve 34 desirably is in the form of a needle valve providing a substantial restriction to flow. The purpose of this will be apparent hereafter. A connection 40 from the surge tank provides air to a switch indicated at 66 which serves to control the illumination of a lamp 68 to give warning in the event that the tire pressure drops abnormally indicating a condition of leakage due to puncture or other accident. The warning thus given serves to indicate to an operator of the elevation meter that the readings being obtained are probably invalid.

Connection 42 from the surge tank serves to deliver air through a shut-off valve 44 and to branch connections 46 and 48 to the front and rear main wheels of the trailer. In Figure 1 wheel glands are diagrammatically indicated at 50 and 52, being detailed in Figure 2. From these glands hose connections 54 and 56 supply air through shut-off valves 58 and 60 to the tire tube connections indicated at 62 and 64. The usual check valves are removed from these tube connections since the tires must not only receive air at proper times but must lose air when, for example, they become heated during use, the object being to maintain in the tires constant pressure during periods of measurements.

Figure 2:
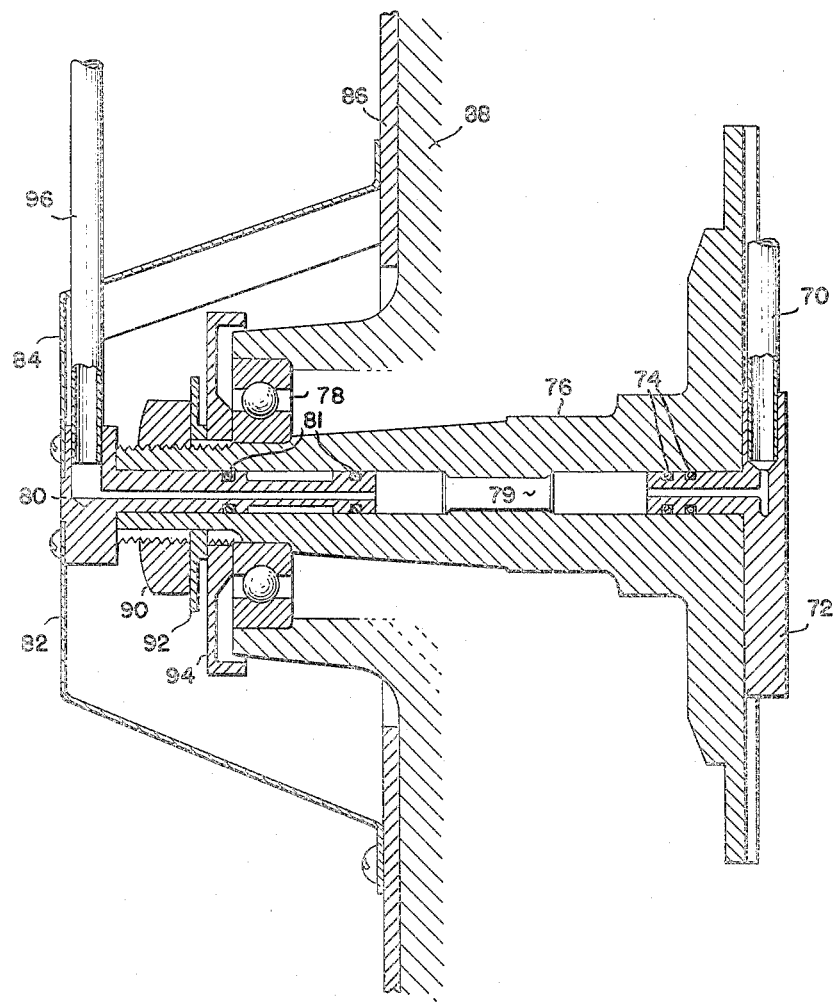
Figure 2 is a sectional and diagrammatic view showing certain details particularly involved in the delivery of air to the pneumatic tires.

Referring now particularly to Figure 2, there are illustrated therein the gland arrangements whereby air is delivered to or from the tires. Tube 70 which may be considered to communicate with either connection 46 or 48 previously described, communicates with an interior bore arrangement of a fitting 72 which is connected to the wheel spindle 76 and projects into a bore 79 therein, packing being provided by O-rings at 74. The spindle 76 supports the wheel in conventional fashion which is not indicated in detail, there being shown only one ball bearing at 78 supporting the wheel drum 88, the wheel disc being indicated at 86. A rotary fitting 80 has a portion projecting into the bore 79 of the spindle, and sealing is provided by O-rings at 81 so that relative rotation between the fitting and the spindle may take place without air leakage. The fitting 80 is forced to rotate with the wheel by connection to spiders 82 and 84 which are secured to the wheel. The bore in the fitting 80 which communicates with passage 79 in turn communicates through tube 96 with the individual tire shut-off valves and the tube connections, the tube 96 in Figure 2 corresponding to the tubes 54 and 56 in Figure 1. Assembly of the wheel on the spindle is provided in conventional fashion by a nut 90, lock washer 92, and dust cap 94.

The operation of the system described is as follows:

The regulator, operating in usual fashion, provides a pressure in chamber 27 which is maintained substantially constant at a value determined by the manual control of spring 37. Air at this pressure is delivered to inflate the tires through the valve 34, surge tank 38 and the other connections running to the tire tubes. As is usual in a regulator of this type, when the proper pressure is attained in the chamber 27, there is a slight bleeding of air from this chamber, with replenishment from chamber 25, the diaphragm assembly at 21 tending to oscillate slightly to maintain the proper pressure. If under conditions of operation of the trailer the tire temperature rises so that pressure in the tire would increase if air was not vented, venting automatically takes place from chamber 27 to maintain the tire pressure substantially constant.

From the standpoint of slow changes of pressure, the valve 34 and surge tank 38 may be regarded as substantially absent, the valve 34 permitting the slight flows to or from the tires necessary to maintain substantially constant pressure conditions. The surge tank and valve, however, have an important function particularly where the terrain is rough. In the event that one or both of the tires have impact with an obstruction, a pressure surge would occur which, in the absence of the surge tank and valve 34 would cause a sudden increase in pressure in regulator chamber 27, causing the valve 23 to open venting communication from this chamber. The result might be a sudden rapid outflow of air which, after the impact terminated, would mean that the tires would be considerably deflated below the desired pressure until the automatic regulator operation again provided inflating air from chamber 25. Due to repeated impacts, the result might be over a period of time, to provide distance readings which would be deficient, and even faulty inclination signals if the two tires had different characteristics of variation of diameter with respect to changes in pressure. The provision of the surge tank 38 and the flow restriction provided by valve 34 prevents the effect of such impacts from being substantially felt at the diaphragm arrangement 21, the pressure in the surge tank momentarily increasing during the impact and then decreasing with restoration of air to the tires after the impact ceases, there being during such a short interval of pressure fluctuation only negligible flow of air through the valve 34. The regulator is accordingly required to maintain the desired constant pressure only under conditions which, viewed from its standpoint, involve at most slow leakage or slow rise of pressure due to tire heating.

The valves at 44, 58 and 60 are normally open during the making of elevation measurements. However, by closing valve 44, the pressures in the tires may be maintained during periods of inaction of the elevation meter when, for example, the apparatus is being transported to or from the locations where measurements are to be made. Under these conditions air is not required to be supplied from the compressor and wear on the parts and consumption of current may be eliminated. For longer inactive trips the valves 58 and 60 may be additionally closed so as to maintain tire pressures despite slow leakages of air which may occur through the wheel gland packings at 74 and 81. Under these same general conditions, the valve 20 may also be closed to avoid loss of air such as normally occurs in the regulator 22.

It will be clear from the above that there is provided an apparatus capable of achieving the objects of the invention. Various changes in details may be made without departing from the invention and it is, therefore, to be understood that the invention is not to be regarded as limited except as required by the following claim.

What is claimed is:

Apparatus for equalization and maintenance of predetermined pressure in a plurality of pneumatic tires of a vehicle comprising means supplying air under pressure, a pressure regulator of the supply-and-waste type receiving air from said supplying means and arranged to maintain at a delivery connection substantially constantly a predetermined pressure, and connections between said delivery connection and the vehicle tires including a surge tank, flow restricting means between the delivery connection of said regulator and said surge tank, and branch connections between the surge tank and each of said tires, said surge tank and flow restricting means acting to dampen pressure surges originating at the tires to prevent the imposition of sudden pressure changes at the delivery connection of the regulator.

References Cited in the file of this patent
UNITED STATES PATENTS

| | | |
|---|---|---|
| 1,338,337 | Stonestreet | Apr. 27, 1920 |
| 1,904,073 | O'Connor et al. | Apr. 18, 1933 |
| 1,988,671 | Stout | Jan. 22, 1935 |
| 2,010,250 | Appelgate | Aug. 6, 1935 |
| 2,685,906 | Williams | Aug. 10, 1954 |